United States Patent
Chen et al.

(10) Patent No.: US 12,395,608 B2
(45) Date of Patent: Aug. 19, 2025

(54) SYSTEMS AND METHODS FOR ENABLING IMPROVED VIDEO CONFERENCING

(71) Applicant: Adeia Guides Inc., San Jose, CA (US)

(72) Inventors: Tao Chen, Palo Alto, CA (US); Serhad Doken, Bryn Mawr, PA (US)

(73) Assignee: ADEIA GUIDES INC., San Jose, CA (US)

( * ) Notice: Subject to any disclaimer, the term of this patent is extended or adjusted under 35 U.S.C. 154(b) by 243 days.

(21) Appl. No.: 18/213,619

(22) Filed: Jun. 23, 2023

(65) Prior Publication Data
US 2024/0430441 A1  Dec. 26, 2024

(51) Int. Cl.
| | | |
|---|---|---|
| H04N 7/15 | (2006.01) | |
| H04L 65/403 | (2022.01) | |
| H04N 7/14 | (2006.01) | |
| H04N 19/154 | (2014.01) | |
| H04N 19/162 | (2014.01) | |
| H04N 19/167 | (2014.01) | |
| H04N 19/172 | (2014.01) | |
| H04N 19/46 | (2014.01) | |

(52) U.S. Cl.
CPC ............ *H04N 7/15* (2013.01); *H04L 65/403* (2013.01); *H04N 7/147* (2013.01); *H04N 19/154* (2014.11); *H04N 19/162* (2014.11); *H04N 19/167* (2014.11); *H04N 19/172* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 11,343,467 B1 * | 5/2022 | Li | H04N 19/124 |
| 11,405,448 B1 * | 8/2022 | Seigneurbieux | H04L 65/612 |
| 2010/0080287 A1 * | 4/2010 | Ali | H04N 21/44209 |
| | | | 375/240.03 |
| 2011/0249077 A1 * | 10/2011 | Abuan | H04N 23/80 |
| | | | 348/14.02 |

(Continued)

FOREIGN PATENT DOCUMENTS

| | | |
|---|---|---|
| WO | 2018017936 A1 | 1/2018 |
| WO | 2018049321 A1 | 3/2018 |
| WO | 2018164932 A1 | 9/2018 |

OTHER PUBLICATIONS

"Use Live Text with your iPhone camera," iPhone User Guide, (downloaded Jun. 27, 23) (2 pages) https://support.apple.com/guide/iphone/use-live-text-iphcf0b71b0e/ios.

(Continued)

*Primary Examiner* — Quoc D Tran
(74) *Attorney, Agent, or Firm* — HALEY GUILIANO LLP

(57) ABSTRACT

Systems and methods are provided for enabling improved video conferencing. A stream comprising a plurality of pictures is received at a computing device. For each picture in the plurality of pictures, the picture is decoded, the decoded picture is stored in a decoded pictures buffer and it is identified that the decoded picture is below a threshold quality. For a first decoded picture that is not below the threshold quality, the decoded picture is stored in a display buffer, accessed from the display buffer, and output for display. For a second decoded pictured that is below threshold quality, a previously output picture is continued to be output for display.

20 Claims, 13 Drawing Sheets

(56) References Cited

U.S. PATENT DOCUMENTS

| 2012/0147973 A1* | 6/2012 | Wu | H04N 19/44 |
| | | | 375/240.01 |
| 2021/0058645 A1* | 2/2021 | Srinivasan | H04N 19/172 |

OTHER PUBLICATIONS

Chauhan, "Text Detection and Extraction From Image with Python, Handy OCR and OpenCV technique to find text in digital image," May 12, 2022 (20 pages) https://medium.com/pythoneers/text-detection-and-extraction-from-image-with-python-5c0c75a8ff14.

* cited by examiner ment may be decoded and stored in a decoded pictures
SYSTEMS AND METHODS FOR ENABLING IMPROVED VIDEO CONFERENCING The present disclosure is generally directed to systems and methods for video conferencing.

SUMMARY

With the proliferation of application-based video conferencing platforms and computing devices such as laptops, smartphones and tablets comprising integrated cameras and microphones, video conferencing has become commonplace. However, video conferencing can be demanding on network bandwidth, both in terms of the absolute bitrate required and the reliability of a connection. Any degradation in network bandwidth may give rise to visual and/or audio artifacts from dropped, or compressed, data. Artifacts in compressed digital media, due to reduction in bandwidth, may be experienced as, e.g., blurring, blocking, bleeding, ringing, ghosting, flickering, floating, jerkiness, and more. For example, when a cellular device connects to a video conference over a cellular connection, the available network bandwidth at the point the device connects to a network may vary as the device is moved and lead to blurring or blocking in the virtual conference video. In another example, network issues may arise if video conference participants are joining from different countries. Even if the individual participants have a stable first-link connection to a network, video conference data being transferred relatively long distances may be subject to network disruption and cause jerkiness or skipping. When viewing a video conference comprising relatively static content such as, for example, slides of a presentation, visual artifacts may make it difficult to read parts of the presentation. Relatively static content tends to comprise a plurality of repeated pictures, which means that bandwidth variations that cause a repeated picture to be compressed with respect to a previous picture may cause more noticeable artifacts, because any artifacts are displayed with respect to a previously high-quality picture, and there is no expectation that the pictures will vary. This is in contrast to dynamic content, where the content itself is changing, which causes any artifacts to be less noticeable, because the content is changing in addition to any artifacts being generated. As such, there is a need to improve the way in which video conferencing data is received and processed, e.g., at a computing device.

To help address these problems, systems and methods are provided herein that enable the improved processing of video conferencing data at a computing device. In particular, the systems and methods herein enable the reduction, or prevention, of visual artifacts and/or the general reduction in quality of static content in a video conference, e.g., when bandwidth fluctuations occur and/or when zooming in on content during a video conference. In an example system, a laptop running a video conferencing application may receive an audiovisual video conferencing stream from a video conferencing provider with the video component of the audiovisual stream comprising a presentation. On receiving the video conferencing stream, the pictures of the video component may be decoded and stored in a decoded pictures buffer. For each picture of the video conferencing stream, it may be identified that the decoded picture is below a threshold quality, for example, that the quality is not high enough to read the presentation text. For a decoded picture that is not below the threshold quality then the decoded picture is stored in a display buffer, accessed and output for display at the laptop. For a decoded picture that is below the threshold quality, a previously output picture may be continued to be output, in place of the decoded picture. In this manner, the output quality of a video conference is maintained in an efficient manner. This efficiency is achieved, in part, because previously received pictures are utilized to maintain output quality, thereby reducing and/or eliminating visual artifacts during fluctuations in network bandwidth.

In accordance with some aspects of the disclosure, a method is provided. The method includes receiving, at a computing device, a stream comprising a plurality of pictures. For each picture in the plurality of pictures, the picture is decoded, stored in a decoded pictures buffer and it is identified that the decoded picture is below a threshold quality. For a first decoded picture that is not below the threshold quality, the decoded picture is stored in a display buffer, accessed and output for display. For a second decoded picture that is below threshold quality, a previously output picture is continued to be output for display. It may be identified that the plurality of pictures comprises static content over a threshold number of frames.

Each picture may comprise a first portion and a sub-picture portion. It may be identified that the sub-picture portion comprises static content over a threshold number of frames. For each picture in the plurality of pictures, the identifying that the decoded picture is below the threshold quality may further comprise identifying that the sub-picture of the decoded picture is below the threshold quality. For a decoded sub-picture that is below the threshold quality, the decoded picture may be stored in the display buffer, accessed and the outputting for display may further comprise outputting, for display, the first portion of the picture and a previously output sub-portion of a picture.

The stream may be a live stream received from a first source. For each picture in the plurality of pictures, for a first decoded picture that is not below the threshold quality, the decoded picture may be stored in a non-volatile storage. For the second decoded picture that is below the threshold quality, a corresponding picture above the threshold quality may be identified from a second source, and the corresponding picture may be stored in the non-volatile storage.

The stream may be a first stream, and the plurality of pictures may be a first plurality of pictures. A second stream comprising a second plurality of pictures may be received, with the second plurality of pictures comprising higher resolution portions of the content of the first stream. Receiving the stream may further comprise receiving the pictures from the first stream and the pictures from the second stream in an alternating manner and, for each picture in the plurality of pictures of the second stream, decoding the picture from the second stream, and storing the decoded picture from the second stream in the decoded pictures buffer. A request to zoom in on a portion of a picture of the first stream may be received, and, from the decoded pictures buffer, a decoded picture from the second stream may be identified that corresponds to the portion of picture of the stream for which the zoom-in request was received. The identified decoded picture from the second stream may be output for display.

For a picture in the plurality of pictures, it may be identified, for the picture and based on a flag associated with the picture, not output a previously output picture for display in place of the picture. For a second decoded picture that is below the threshold quality, the decoded picture may be stored in a display buffer, accessed from the display buffer and output for display.

The content of the plurality of pictures may comprise text. Metadata describing the text location and position within each picture of the plurality of pictures may be received. A reduction in a quality of the received stream may be identified. For each picture in the plurality of pictures, for a first decoded picture that is not below the threshold quality, the text may be rendered based on the received metadata, and outputting the decoded picture for display may further comprise concurrently outputting, for display, the decoded picture and the rendered text at the location described in the metadata. For a second decoded picture that is below the threshold quality, continuing to output the previously output picture for display may further comprise concurrently outputting, for display, the previously output picture, and the rendered text at the location described in the metadata. The stream may comprise the plurality of pictures and the metadata.

The content of the plurality of pictures may comprise text. Metadata describing the text location and position within each picture of the plurality of pictures may be received, and an input corresponding to a described text location may be received. For each picture in the plurality of pictures, for a first decoded picture that is not below the threshold quality, the text may be rendered based on the received metadata, the text, and outputting the decoded picture for display may further comprise concurrently outputting, for display, the decoded picture and the rendered text at the location described in the metadata. For a second decoded picture that is below the threshold quality, continuing to output the previously output picture for display may further comprise concurrently outputting, for display, the previously output picture and the rendered text at the location described in the metadata. The input may be a first input, and a second input to copy the output text may be received. The copied output text may be stored, based on the received metadata, on a clipboard of the computing device.

For the second decoded picture that is below the threshold quality, a text portion and a corresponding location may be identified in the previously output picture. Text recognition may be applied to the text portion, and the text may be rendered based on the text recognition. Continuing to output the previously output picture for display may further comprise concurrently outputting, for display, the previously output picture and the rendered text at the identified location.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
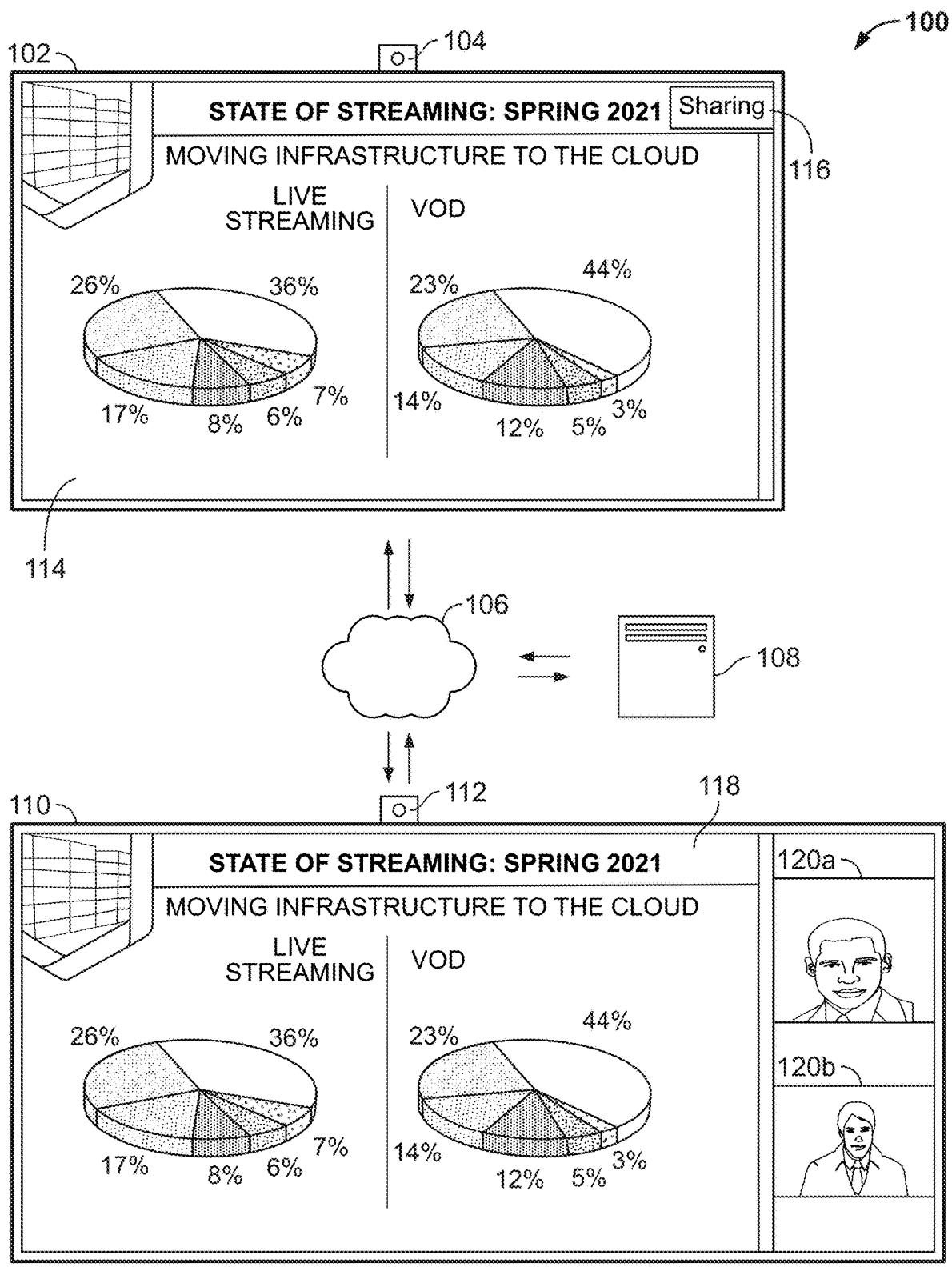
FIG. 1 shows an example environment for enabling improved video conferencing, in accordance with some embodiments of the disclosure.

Systems and methods are provided herein that enable the improved processing of video conferencing data at a computing device. A stream comprising a plurality of pictures includes a video-only stream and/or an audiovisual stream. The pictures of a stream may represent audio, video, text, a video game, a screen share and/or any other media content. The pictures of a stream may comprise, for example, an I-frame followed by a plurality of P-frames and/or B-frames. One example of a suitable stream is a stream that is transmitted between video conferencing clients. A stream may, for example, be streamed to physical computing devices. In some examples, a single stream may be multicast to a plurality of computing devices. In further examples, separate connections, and associated streams, may be set up for each computing device partaking in a video conference or webinar. In another example, streams may, for example, be streamed to virtual computing devices in, for example, an augmented environment, a virtual environment and/or the metaverse.

Generating for output includes displaying the pictures of a stream at a display integral to a computing device and/or generating the pictures of a stream for display on a display connected to a computing device.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality headset, a mixed reality device, a virtual reality device, a gaming console, or any other television equipment, computing equipment, or wireless device, and/or combination of the same. Typically, a computing device may also comprise an internal and/or external camera and/or microphone to enable a user to participate in a video conference.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment for enabling improved video conferencing, in accordance with some embodiments of the disclosure. The environment 100 comprises a first computing device 102, a network 106, a server 108 and a second computing device 110. The first and second computing devices 102, 110 may be any suitable computing devices for participating in a video conference including, for example laptops, smartphones and/or tablet devices. Although two computing devices are shown in this example, any number of computing devices may take part in a video conference only limited by, for example, hardware and/or software limitations. Other numbers of video conference participants include, for example, three, 10, 15, 25, 50, 80, 100 or 500. In a typical video conference, computing devices 102, 110 may run a dedicated video conferencing application such as, for example, a Microsoft Teams and/or a Zoom application. In other examples, one or more of the computing devices 102, 110 may run a generic program, such as a web browser. A video conference may be initiated and/or delivered via the dedicated application and/or generic program.

In this example, a video conference is initiated at the first computing device 102, and the first computing device 102 communicates with the other video conference participants, such as the second computing device 110, via network 106, such as the internet. The network 106 may comprise wired and/or wireless means. In this example, a video conference is managed via the server 108; however, the server is optional. In some examples, the video conference may take place directly between two or more participants and/or in a peer-to-peer manner.

In this example, the first and second computing devices comprise integrated camera and microphone units 104, 112; however, in other examples either of the microphone and/or camera may be attached to a respective computing device 102, 110 via wired and/or wireless means as a peripheral device. In other examples, the computing device may not have a camera and/or microphone attached and may be set to, for example, a receive-only mode.

In this example, the first computing device is sharing the contents of its screen 114 with the other video conference participants (e.g., the second computing device 110). In this example, the content of the screen 114 includes a presentation that comprises text; however, any other screen content is contemplated. In this example, an optional indicator 116 is displayed, indicating that the screen of the first computing device 102 is being shared with the other video conference participants. In this example, the camera 104 is also capturing a stream that is being simultaneously broadcast, with the contents of the screen 114, to the other video conference participants. In some examples (not shown), the stream from the camera 104 may be displayed at a display of the first computing device 102 in addition to, or as well as, the content that is being shared with the other video conference participants.

The second computing device 110 (and any other video conference participants) receives the shared screen and any capture from the camera and/or microphone from the first computing device 102. In this example, the shared screen is output for display at the second computing device 110 such that the contents of the screen on the first computing device 102 are displayed 118 on a display of the second computing device 110. In this example, the screen of the second computing device 110 also displays the capture 120a from the camera of the first computing device 102, and a capture 120b from the camera of the second computing device 110. In other examples, either, or both, of the captures 120a, 120b may not be displayed at the second computing device 110. The arrangement depicted in FIG. 1 may be used with any other example discussed herein.

Figure 2:
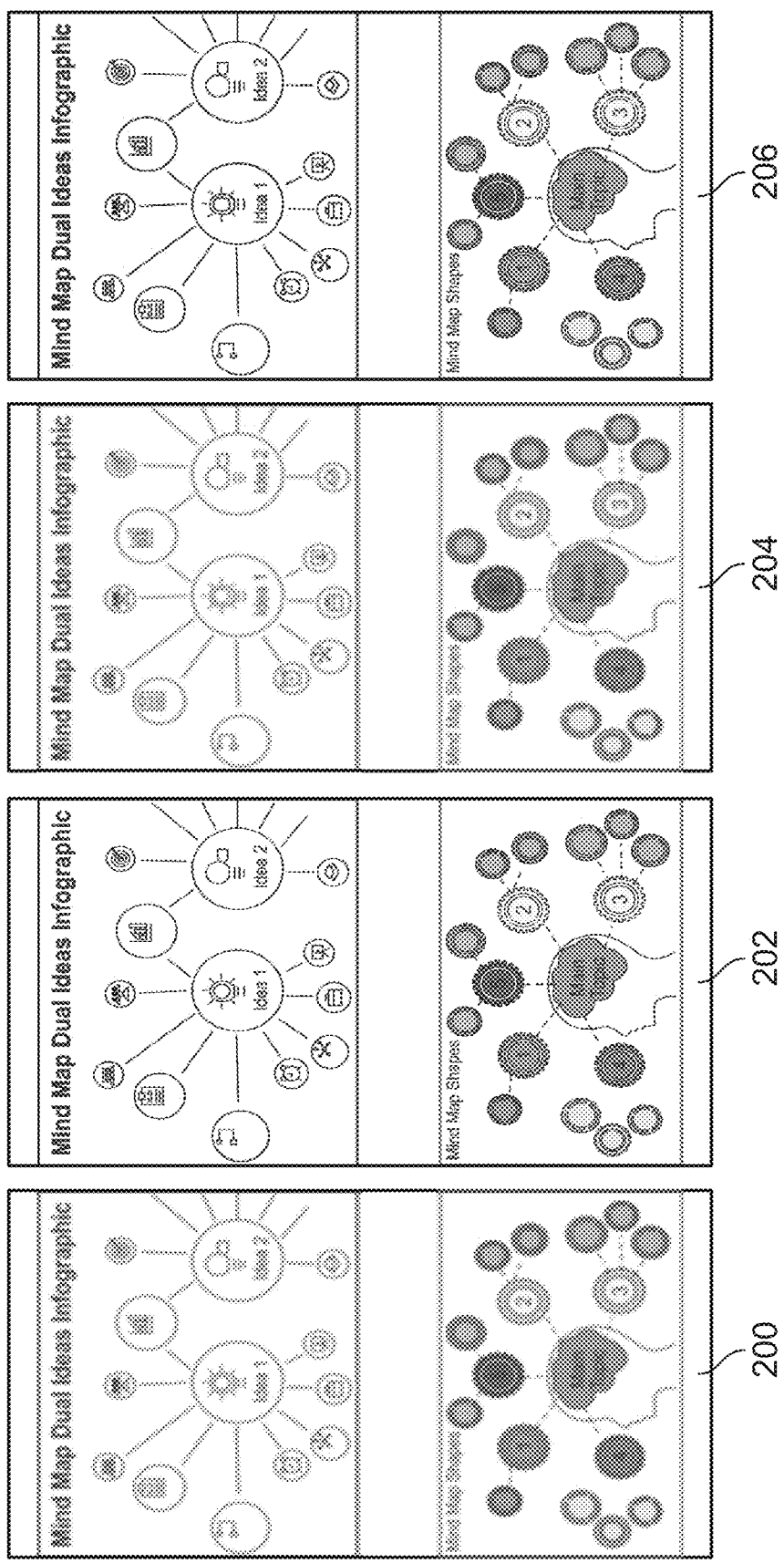
FIG. 2 shows example video conference picture quality fluctuation over time.

FIG. 2 shows example video conference picture quality fluctuation over time. During a video conference, a shared presentation (e.g., a shared PowerPoint presentation, PDF document and/or Word document) may be transmitted for display for an extended period of time (i.e., the displayed content may be relatively static). However, in a traditional video conference, quality variations may occur over time as network conditions, such as bandwidth conditions vary. This may arise because a shared presentation may be continuously transmitted, with new pictures being transmitted at regular intervals. In this example, relatively bad network conditions impact the shared content such that a relatively low-quality image 200 is generated for display at a first time point. The network conditions then improve such that a relatively high-quality image 202 is generated for display at a second time point. The network conditions then degrade again such that a relatively low-quality image 204 is generated for display at a third time point. The network conditions proceed to improve such that a relatively high-quality image 206 is generated for display at a fourth time point. In some examples, the relatively low quality images 200, 204 may be so degraded that text and/or graphic elements may be unreadable by video conference participants.

When they occur, the aforementioned changes to a relatively low-quality image may be observed at a, for example, slide change, and the quality may recover to a better quality with time. The quality fluctuation may also persist on a same slide as a periodical phenomenon, e.g., a static slide appears to be blurred, crisp, and then blurred again (as discussed in connection with FIG. 2 above). In live streaming and video conferencing applications, content may be compressed to reduce the amount of data that needs to be transmitted between video conferencing participants. This may include all types of audiovisual data, including shared screen content. A reduction in bandwidth at either the transmitting computing device and/or a receiving computing device may lead to picture quality degradation.

Figure 3:
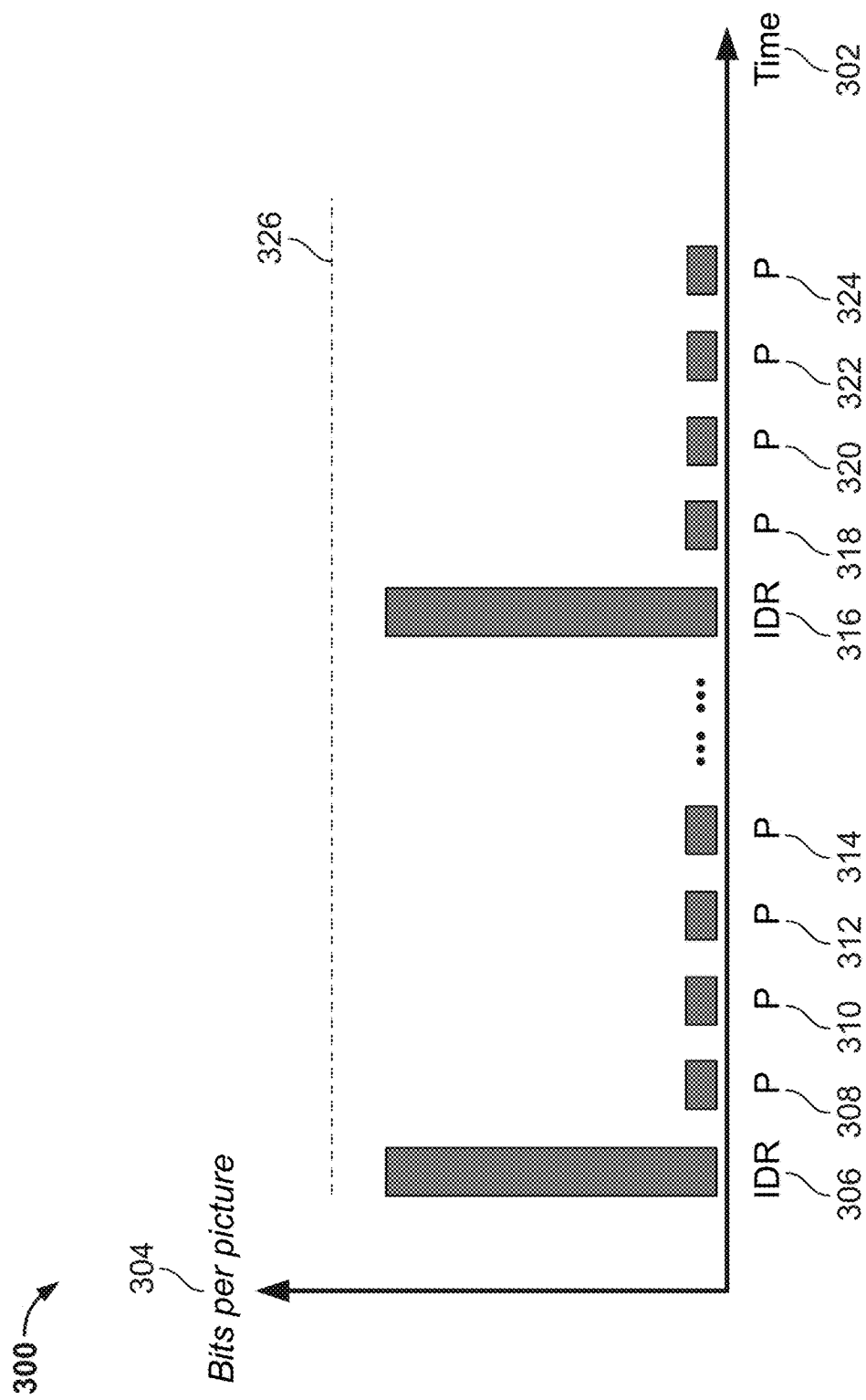
FIG. 3 shows an illustrative example of bits per picture in encoding a sequence of static pictures.

FIG. 3 shows an illustrative example of bits per picture in encoding a sequence of static pictures. Video compression applied to a static scene of a video conference, or non-changing slide, may exhibit a predictable trend of bit allocation across frames. FIG. 3 illustrates a typical case where the instantaneous decoding refresh (IDR) pictures, I-frames, are encoded with a lot more bits than the subsequent predictively coded frames, P-frames. In this example, the P pictures can be encoded at a much lower bitrate due to a high-quality reference. In addition, or alternatively, the P-frames may be replaced with and/or supplemented with B-frames. In this example, P pictures are used for inter prediction and coding without loss of generality.

The graph 300 depicted in FIG. 3 indicates how a number of bits per picture, y-axis 304, may change with respect to time, x-axis 302. Each of the bars represents the bitrate of a picture 306-324 that is received, decoded and displayed at a computing device during a video conference. In this example, a first I-frame 306 of a video conference is transmitted, which has a relatively high number of bits per picture. This first I-frame 306 is followed by a first plurality of P-frames 308-314 at a relatively lower number of bits per picture. A second I-frame 316 of the video conference is transmitted, again at a relatively high number of bits per picture. This second I-frame 316 is followed by a second plurality if P-frames 318-324, again at a relatively low number of bits per picture. In this example, there is sufficient bandwidth to deliver the I-frames and the P-frames of the video conference, so the computing device of the video conference participant outputs pictures at a consistent quality, indicated by the dashed line 326.

Figure 4:
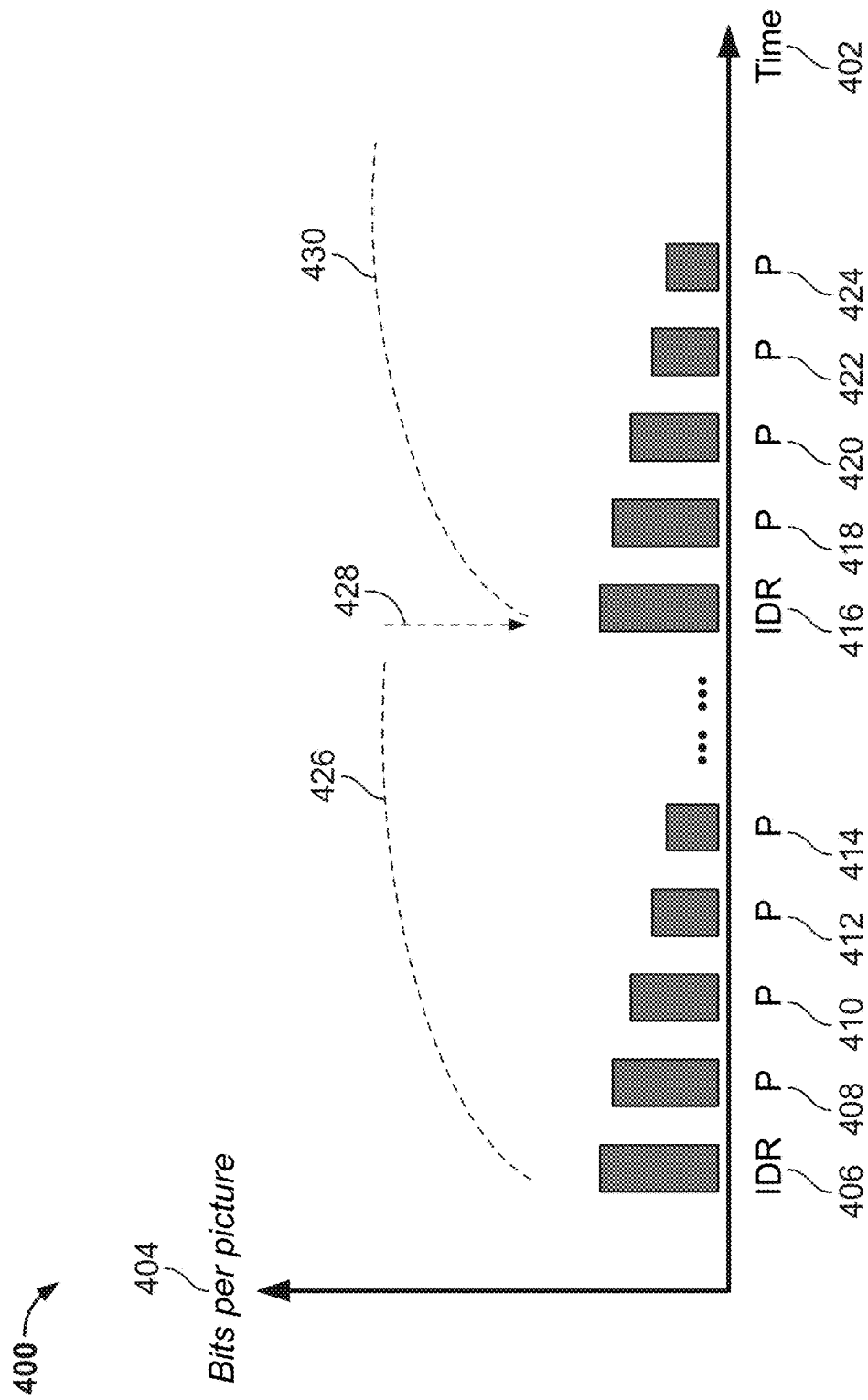
FIG. 4 shows another illustrative example of bits per picture in encoding a sequence of static pictures.

FIG. 4 shows another illustrative example of bits per picture in encoding a sequence of static pictures. The scenario discussed in connection with FIG. 3 may work well when there is sufficient bandwidth to deliver the relatively large bits per picture I-frames in time for decoding and display. However, if the bandwidth is reduced and the relatively large pictures cannot be delivered in time (e.g., in a one-frame duration), video compression settings may have to change. Typically, this change in video compression settings leads to a relatively smaller number of bits being allocated to the I-frames, and the bits per picture may be observed as shown in FIG. 4 and discussed herein. The I-frames of FIG. 4 are now encoded at a lower rate than the I-frames of FIG. 3. As a result, the picture quality of the I-frames may be degraded. In addition, the subsequent P-frames may not have a good reference for inter prediction, and thus may require more bits to encode the residues. The picture quality of this static slide, which plateaus out after a number of frames, may improve over time. However, at the next I-frame, there may be a quality drop that may give rise to a relatively large visual impact, due to, for example, persisting fluctuation, as discussed in connection with FIG. 2. Bandwidth reduction and fluctuation may occur at either the uplink or the downlink connection. Those conditions may impact the settings in video compression for either the uploading by the presenter or the downloading by a receiver.

The graph 400 depicted in FIG. 4 indicates how a number of bits per picture, y-axis 404, may change with respect to time, x-axis 402. Each of the bars represents a picture 406-424 that is received, decoded and displayed at a computing device during a video conference. In this example, a first I-frame 406 of a video conference is transmitted, which has a relatively high number of bits per picture; however, due to, for example, network constraints, the I-frame 406 has a lower number of bits per picture than the corresponding I-frame 306 from FIG. 3. This first I-frame 406 is followed by a first plurality of P-frames 408-414, each with a decreasing number of bits per picture. A second I-frame 416 of the video conference is transmitted, again at a relatively high number of bits per picture; however, due to, for example, network constraints, the I-frame 416 has a lower number of bits per picture than the corresponding I-frame 316 from FIG. 3. This second I-frame 416 is followed by a second plurality of P-frames 418-424, again each with a decreasing number of bits per picture. In this example, there is not, for example, sufficient bandwidth to deliver the I-frames and the P-frames of the video conference at a consistent quality, so the computing device of the video conference participant outputs pictures at a varying quality, indicated by the dashed lines 426, 428, 430. In this example, the quality slowly increases with time as more P-frames of the first plurality of P-frames are delivered; however, a sharp decrease in quality 428 occurs at the second I-frame 416 due to the network constraints.

Figure 5:
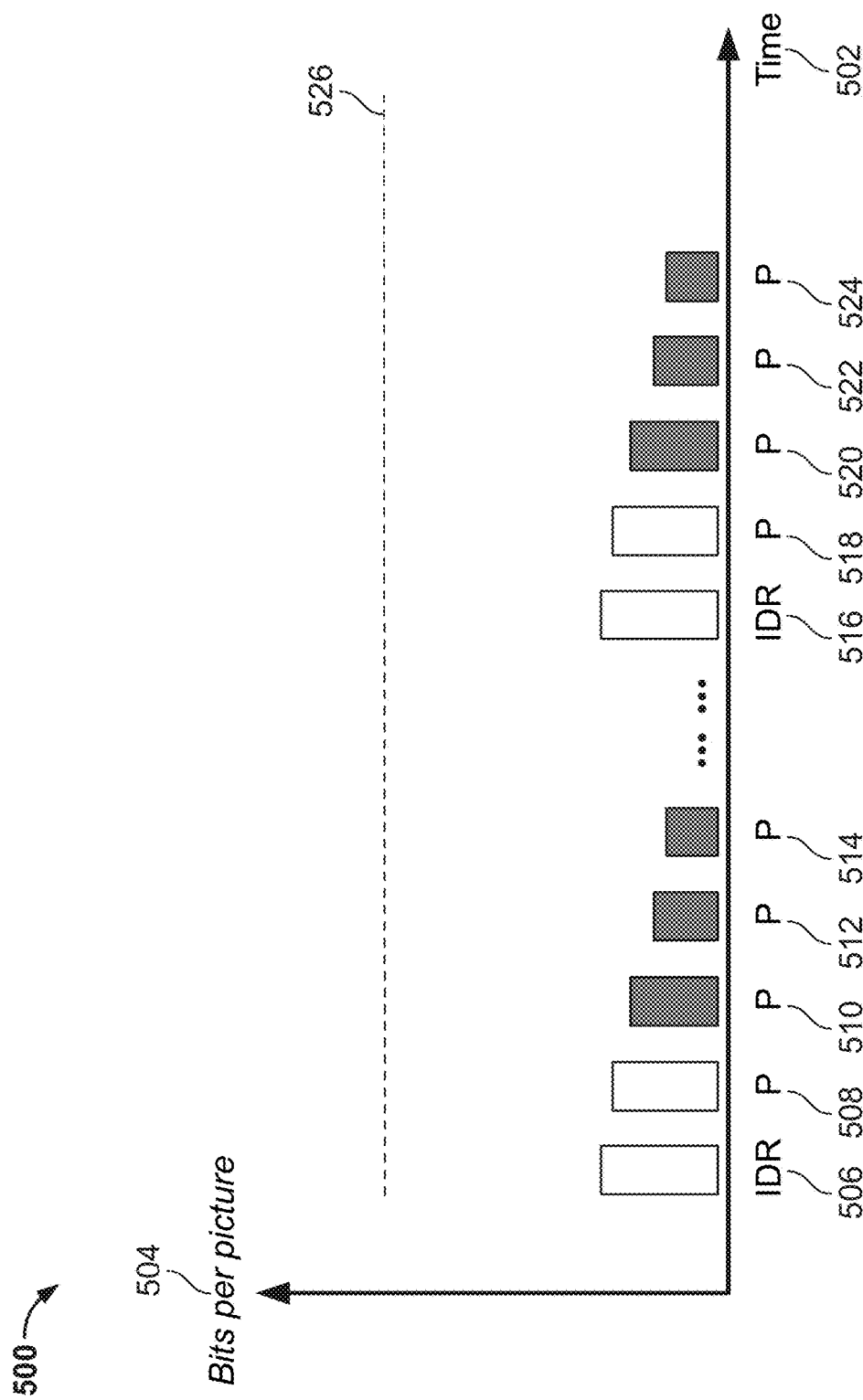
FIG. 5 shows an illustrative example of improved video conferencing pictures, in accordance with some embodiments of the disclosure.

FIG. 5 shows an illustrative example of improved video conferencing pictures, in accordance with some embodiments of the disclosure. The fluctuation and degradation of picture quality in a static scene or presentation slide of a video conference in response to varying network conditions may be predictable. Effective mitigation of such degradation can be feasible when appropriate signaling of picture presentation is enabled. Such processing can be done at the encoder, and therefore this eliminates the need to change the standard decoding process. Analysis at the encoder can better manage resolution change that occurs in response to varying bandwidth conditions to improve the picture quality of screen-shared content when bandwidth becomes a bottleneck. Reducing picture resolution of a static slide may not be necessary and when avoided, it helps to preserve the quality and improve the ultimate presentation quality.

When receiving a video conference stream at a video decoder and player, not all the decoded pictures have to be displayed. A decoded picture buffer may be used to ensure the normative decoding process of pictures, or sub-pictures (e.g., a presentation slide may be a sub-picture of a picture). In some examples, a sub-picture may comprise relatively static content, such as a presentation slide, and the rest of the picture may comprise relatively dynamic content, such as a capture of a talking person received via a video camera. Assuming a static slide is being transmitted in a video conference, FIG. 5, and the discussion herein, illustrates the picture quality variation in the decoding. Decoded pictures of lesser quality can be signaled for no presentation, or not-to-display. When the quality of a decoded picture or sub-picture corresponding to the slide exceeds a threshold, the picture may be added to the display buffer for presentation.

The graph 500 depicted in FIG. 5 indicates how a number of bits per picture, y-axis 504, may change with respect to time, x-axis 502. Each of the bars represents a picture 506-524 that is received and decoded at a computing device during a video conference. In this example, a first I-frame 506 of a video conference is transmitted, which has a relatively high number of bits per picture; however, due to, for example, network constraints, the I-frame 506 has a lower number of bits per picture than the corresponding I-frame 306 from FIG. 3. This first I-frame 506 is followed by a first plurality of P-frames 508-514, each with a decreasing number of bits per picture. A second I-frame 516 of the video conference is transmitted, again at a relatively high number of bits per picture; however, due to, for example, network constraints, the I-frame 516 has a lower number of bits per picture than the corresponding I-frame 316 from FIG. 3. This second I-frame 516 is followed by a second plurality if P-frames 518-524, again each with a decreasing number of bits per picture. In this example, there is not, for example, sufficient bandwidth to deliver the I-frames and the P-frames of the video conference at a consistent quality.

However, in this example, although the first I-frame 506 and subsequent P-frame 508 are received and decoded at the computing device, they are not displayed. In a similar manner, the second I-frame 516 and subsequent P-frame 518 are received and decoded at the computing device but are not displayed. In this example, only the following P-frames 510-514, 520-524 are received, decoded and displayed. In this manner, rather than the varying quality depicted in FIG. 4, a consistent quality is achieved, as indicated by the dashed line 526.

For those skipped pictures, or sub-pictures, the display and presentation processes may continue with (by repeating) the last picture in the display buffer. This does not create a temporal discontinuity since the content is a same slide presented in the picture or sub-picture. When the slide is included as a sub-picture, the remaining part of the picture may be continuously displayed, i.e., not skipped. For example, the captures 120a, 120b of FIG. 1, may exhibit a continuous and smooth motion, albeit at a degraded quality due to the reduced bandwidth.

At a slide change, the new slide can be encoded as either an I-frame or a P-frame. When the slide content of a video conference shows sufficient difference from the previous slide, the encoded picture may show a burst of bits per picture. When such a burst is not desired, the bitrate for the new slide may be lowered, which as a result may introduce a quality drop. The signaling of decoded-but-not-to-display can also be applied if there is an obvious degradation in picture quality at the slide change. The initial low-quality pictures, or sub-pictures, of a new slide can be signaled for no presentation.

In video compression for live streaming, the reduction of bitrate may be initiated in response to a drop in the network bandwidth. As a result, the effect can be a reduced picture resolution. This may help to reduce bitrates for all the pictures including I-frames; however, this may lead to reduced picture quality due to the compression. The method discussed in connection with FIG. 5 enables the bits per picture to be allocated in a manner that enables the later decoded pictures to have an improved quality, as pictures of the original resolution are generated for display.

Signaling created in a first encoding may be relayed in a transcoding that occurs in a pipeline of live or non-live streaming. In a later viewing of a recorded presentation of a video conference, the pictures or sub-pictures of degraded slide quality may be upgraded to a better version that exists in the same bitstream. In an offline production of such upgrades, the transcoding may composite, or replace, the sub-picture of a video conference slide with a better quality that is decoded, and possibly detected, from other pictures or segments.

Figure 6:
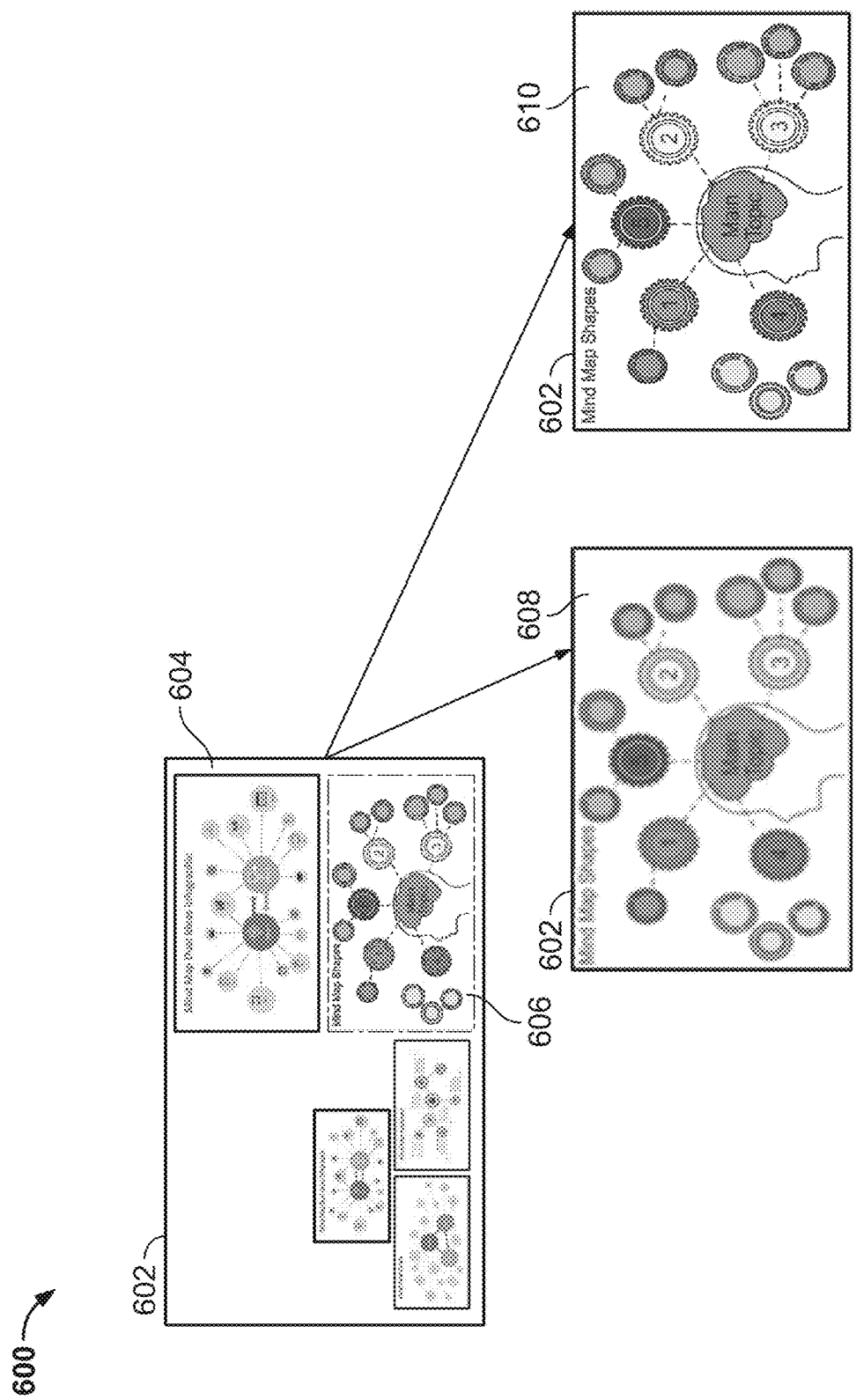
FIG. 6 shows an example environment for enabling improved video conferencing when a user zooms in on a video conference picture, in accordance with some embodiments of the disclosure.

FIG. 6 shows an example environment for enabling improved video conferencing when a user zooms in on a video conference picture, in accordance with some embodiments of the disclosure. The environment 600 comprises a computing device 602 receiving a shared presentation 604 via a video conference. In this example, a user input is provided, which indicates that a portion of the video conference should be zoomed in on. In this example, the portion is indicated by the dashed box 606. In some examples, the user input may be a shape, such as a square or a rectangle that is drawn around a portion of the presentation that should be zoomed in on. In another example, the area for zooming may be preset, and the user input may be a selection of a preset area. For example, a display may be split into four equal portions, and an input may be associated with one of the four portions. In other examples, any number of suitable portions may be used, such as two, six and/or eight.

In a first example, the zoomed-in portion may be a relatively low-quality portion 608 because, for example, the zoomed in portion is simply upscaled.

In a second example, the zoomed-in portion may be a relatively high-quality portion 610 because a video conferencing solution may implement a solution as described in connection with FIG. 7 below. In some examples, on receiving such a zoom-in request, the transmitting computing device and the server may collaboratively decide what the best content is to encode and to deliver to each participant of a video conference.

Figure 7:
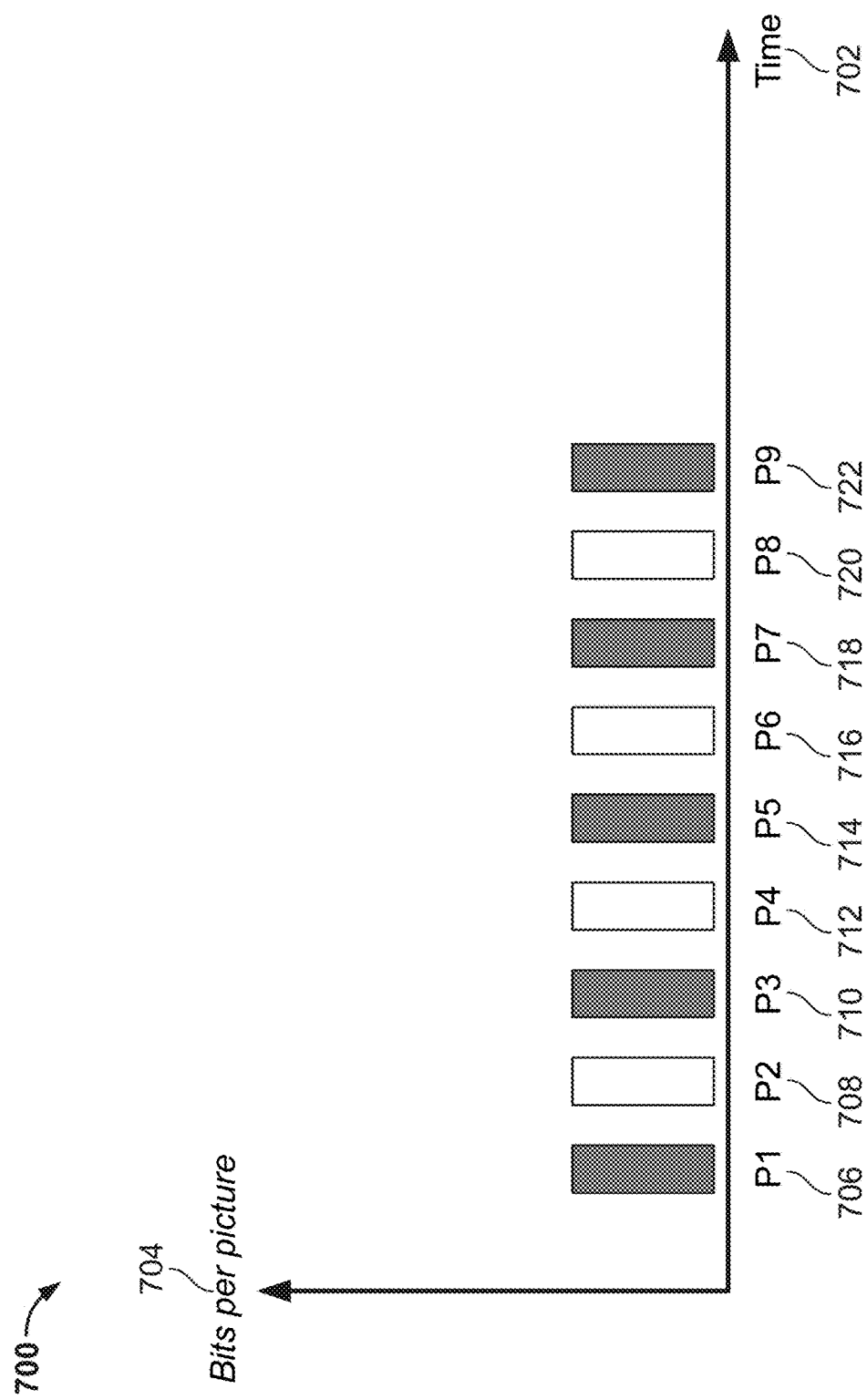
FIG. 7 shows an illustrative example of bits per picture in video conference zooming, in accordance with some embodiments of the disclosure.

FIG. 7 shows an illustrative example of bits per picture in video conference zooming, in accordance with some embodiments of the disclosure. The graph 700 depicted in FIG. 7 indicates how a number of bits per picture, y-axis 704, may change with respect to time, x-axis 702. Each of the bars represents a picture 706-722 that is received, decoded and displayed at a computing device during a video conference. In this example, the pictures alternate between pictures 706, 710, 714, 718, 722 of the main content, such as a presentation, that is being broadcast to video conference participants, and pictures 708, 712, 716, 720 of a zoomed-in portion of the main content that is being broadcast to video conference participants. For example, if there are four portions that may be zoomed in on, each of the pictures 708, 712, 716, 720 is of a separate portion of the main content. In this manner, a zoomed-in portion of content may have the same bits per picture as the main portion of content that is being broadcast. The received zoomed-in portions may be received, decoded and stored in a buffer, where they may be retrieved in response to receiving a zoom-in request.

The buffering of pictures that are not to be presented may be kept to the point of a video conference slide change. This method enables all the standard video codecs to deliver a higher resolution slide for a user to explore finer detail when desired. It does not require a change to the picture resolution in the middle of a bitstream, which essentially forces inserting an I-frame and increases the bitrate. The encoding of higher resolution quadrants may still take advantage of the lower resolution reference pictures for inter prediction. Furthermore, as an example, this method may be combined with the reference picture resampling option that is available in the versatile video coding standard. The higher-resolution pictures may serve as better references for the inter prediction in encoding the lower-resolution pictures.

During the streaming session, such as during a video conference, a streaming sender client, such as a computing device, may run a "live text" functionality on the content being streamed using one or more known computer vision methods, such as via the OpenCV library. For example, a user may be sharing a presentation during a video conference, and the slides of the presentation may be processed using computer vision. This "Live Text" functionality may be run before encoding the content for transmitting to the other video conference participants, and may generate metadata relating to any recognized text in the, for example, presentation. The metadata may be transmitted, along with the encoded stream of the video conference, to the video conference participants. The metadata may comprise the recognized text, along with the text font type, size of the text and location within an I-frame of where the text should be appear. The metadata can be ended and may be sent in-band (i.e., with the stream of the video conference), or it may be sent out of band separate from the payload.

During the streaming session, such as during a video conference, the receiving streaming client or clients, such as a computing device or computing devices, when detecting a low bandwidth, or deteriorating bandwidth, condition, may read the transmitted metadata about the text and render the text at the location specified in the metadata with the indicated font and size. In another example, a receiving streaming client may receive an input such as a mouse hover, screen tap and/or hold, or indication of a detected eye gaze and may render the text as specified in the metadata, if the location of the user input matches the intended rendering location of the text in the received metadata. The text may be rendered in a greater size than the original (e.g., two times as large) when this input is received. Once rendered, an input may also be used to highlight and copy the text, which is a copy of the metadata buffer, into the device clipboard. This may enable users to copy textual content from, for example, a video conference that has overlays of information.

In another example, a receiving streaming client may detect a low bandwidth, or deteriorating bandwidth condition, and it may check its decoding buffer to locate an I-frame received during a normal or high bandwidth period. If such an I-frame can be located, the receiving streaming client may replace the current I-frame with the high-quality one, and the high-quality I-frame may be rendered. If there is not a high-quality I-frame in the buffer, the receiving streaming client may use the metadata generated by the streaming sender client that has run the computer vision functionality to detect the parameters indicated by the metadata, such as the text, font, size and/or location on the I-frame that was received during the normal, or high, bandwidth period and use that metadata to render the text with better quality.

Figure 8:
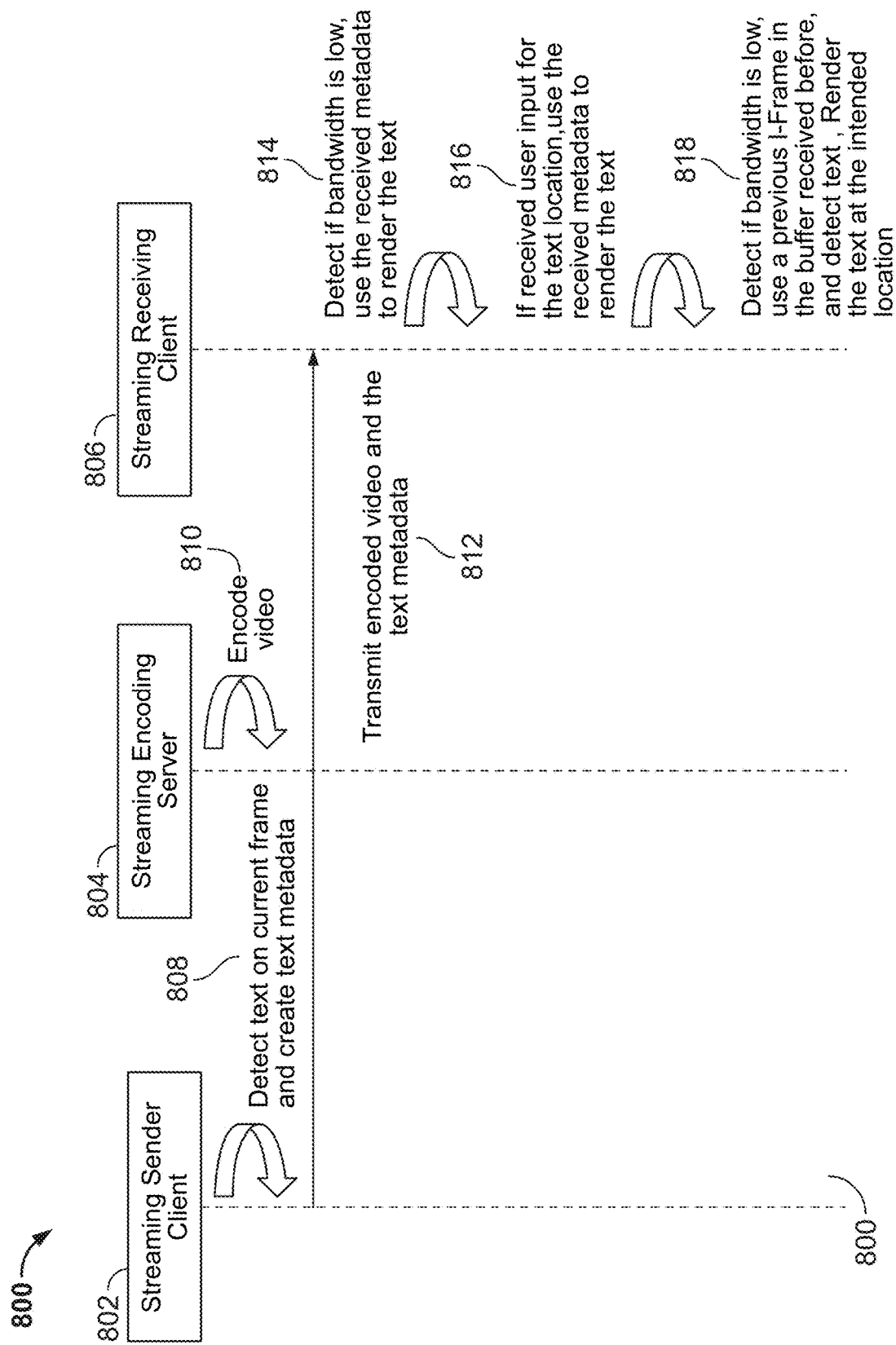
FIG. 8 shows an illustrative example for enabling improved video conferencing, in accordance with some embodiments of the disclosure.

FIG. 8 shows an illustrative example for enabling improved video conferencing, in accordance with some embodiments of the disclosure. The environment 800 comprises a streaming sender client 802, a streaming encoding server 804, and a streaming receiving client 806. The clients 802, 806 may be any suitable computing device. Content, such as a presentation, is shared from the streaming sender client 802 to the streaming receiving client 806 via a video conference. In some examples, there may be any number of streaming receiving clients 806 including, for example, three, 10, 15, 25, 50, 80, 100 or 500.

At the streaming sender client, at 808, any text on a current frame of the video conference (e.g., text on a shared presentation) is detected, and text metadata is created. In some examples, this may be performed via a computer vision library, such as OpenCV. A font, size and/or location of the text may be detected and indicated in the text metadata. At the streaming encoding server, video is encoded 810, and the encoded video and the text metadata are transmitted 812 from the respective streaming sender client 802 and streaming encoding server 804 to the streaming receiving client 806.

At the streaming receiving client 806, it is detected if the bandwidth is low enough to impact the quality of the received stream. On detecting that the quality of the received stream is impacted, the received metadata is used to render the text of the content at 814. In some examples, user input may be received to indicate the location of the text with respect to the content. In this example, the received metadata is used to render the text at 816. In some examples, if the bandwidth is low enough to impact the quality, a previous I-frame is taken from a buffer, and text is detected in that I-frame, and, at 818, the text is rendered at the intended location.

Figure 9:
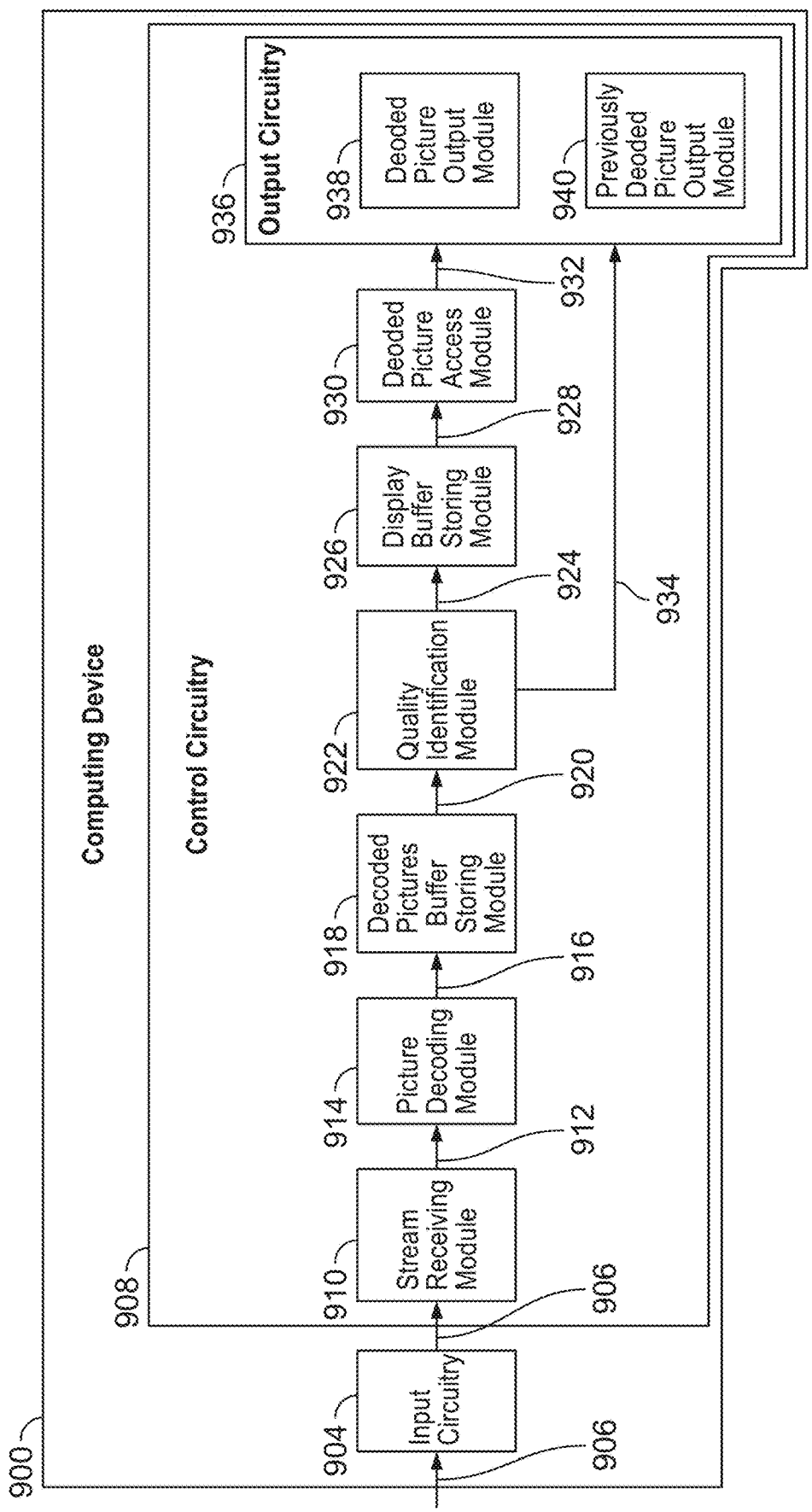
FIG. 9 shows a block diagram representing components of a computing device and dataflow therebetween for enabling improved video conferencing, in accordance with some embodiments of the disclosure.

FIG. 9 shows a block diagram representing components of a computing device and dataflow therebetween for enabling improved video conferencing, in accordance with some embodiments of the disclosure. Each component, or module, of the system may be implemented on one or more computing devices. Computing device 900 comprises input circuitry 904, control circuitry 908 and output circuitry 936. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 902 by the input circuitry 904. The input circuitry 904 is configured to receive inputs related to a computing device. For example, this may be via a microphone, a camera, a touchscreen, a Bluetooth and/or Wi-Fi controller of the computing device 900, an infrared controller, a keyboard, and/or a mouse. In other examples, this may be via gesture detected via an extended reality device. In another example, the input may comprise instructions received via another computing device. The input circuitry 904 transmits 906 the user input to the control circuitry 908.

The control circuitry 908 comprises a stream receiving module 910, a picture decoding module 914, a decoded pictures buffer storing module 918, a quality identification module 922, a display buffer storing module 926, a decoded pictures access module 930 and output circuitry 936 comprising a decoded picture output module 938 and a previously decoded picture output module 940. Each of the components 910, 914, 918, 922, 926, 930, 938, 940 may be implemented on the same and/or separate computing devices.

The input is transmitted 906 to the stream receiving module 910, where a stream comprising a plurality of pictures is received. On receiving a picture of the plurality of pictures, the picture is transmitted 912 to the picture decoding module 914, where the picture is decoded. The decoded picture is transmitted 916 to the decoded pictures buffer storing module 918, where the decoded picture is stored in a decoded pictures buffer. The decoded picture is transmitted 920 from the decoded pictures buffer to the quality identification module 922, where it is determined whether the picture is below a threshold quality level.

For a picture that is not below the threshold quality level, the picture is transmitted 924 from the quality identification module 922 to the display buffer storing module 926, where the decoded picture is stored in a display buffer. The decoded picture is transmitted 928 from the display buffer to the decoded pictures access module 930, where a decoded picture is accessed for display. The decoded picture is transmitted 932 to the decoded picture output module 938 at the output circuitry 936, where the decoded picture is output for display.

For a picture that is below the threshold quality level, the picture is transmitted 934 to the previously decoded picture output module 940 at the output circuitry 936, where a previously displayed picture continues to be output for display.

Figure 10:
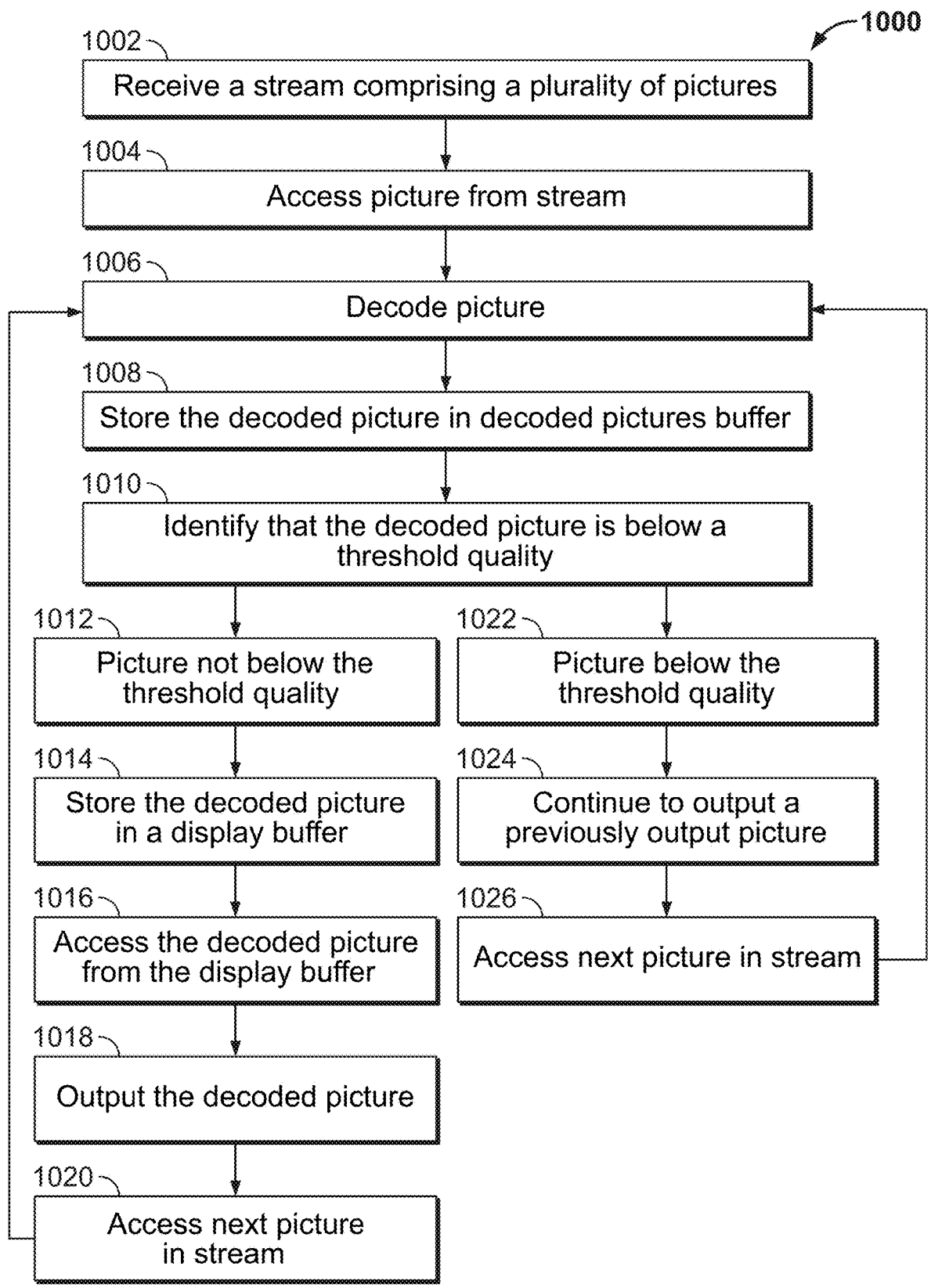
FIG. 10 shows a flowchart of illustrative steps involved in enabling improved video conferencing, in accordance with some embodiments of the disclosure.

FIG. 10 shows a flowchart of illustrative steps involved in enabling improved video conferencing, in accordance with some embodiments of the disclosure. Process 1000 may be implemented, in whole or in part, on any of the aforementioned computing devices (e.g., computing devices 102, 110, 602, 900, e.g., by way of executing one or more instructions or routines stored in the memory or storage of a device). In addition, one or more actions of the process 1000 may be incorporated into or combined with one or more actions of any other process or embodiments described herein.

At 1002, a stream comprising a plurality of pictures is received, and at 1004, a picture from the stream is accessed. For example, a participating computing device in a video conference receives a video conference stream comprising a plurality of pictures, and the computing device accesses a picture from the stream. At 1006, the accessed picture is decoded, and, at 1008, the decoded picture is stored in the decoded pictures buffer. Continuing the example, the computing device decodes the accessed picture and stores it in a decoded pictures buffer. At 1010, it is identified that the decoded picture is below a threshold quality. The example computing device identifies that the decoded picture is below a threshold quality. For example, the computing device may identify a bitrate associated with the picture. In another example, the computing device may use a trained machine learning algorithm to detect whether any text in the picture is readable or not.

At 1012, it is identified that a picture that is not below the threshold quality, and, at 1014, the picture is stored in a display buffer. The example computing device may determine that, for example, a bitrate associated with the picture is above a threshold bitrate and/or that any text is readable. At 1016, the decoded picture is accessed from the display buffer, and, at 1018, the decoded picture is output, or generated for output. The computing device may access the picture from the display buffer and may output the picture at a display attached to the computing device. At 1020, the next picture in the stream is accessed, and the process loops back to step 1006 until, for example, all of the pictures in the stream have been accessed.

At 1022, it is identified that a picture that is below the threshold quality, and, at 1024, a previously output picture is continued to be output, or generated for output. The example computing device may determine that, for example, a bitrate associated with the picture is below a threshold bitrate and/or any text is not readable. A previously displayed picture is accessed and is output at a display attached to the computing device. At 1026, the next picture in the stream is accessed, and the process loops back to step 1006 until, for example, all of the pictures in the stream have been accessed.

Figure 11:
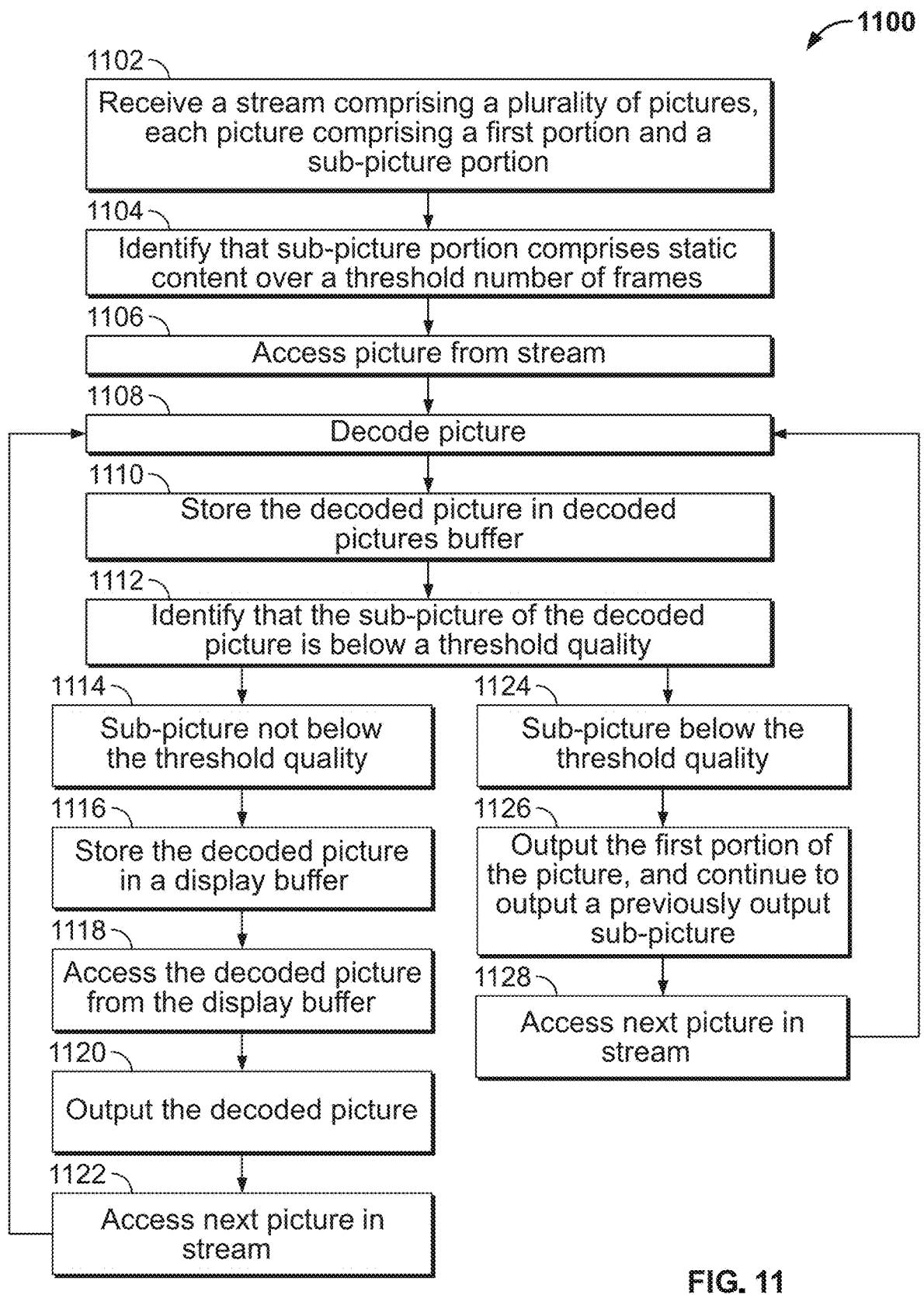
FIG. 11 shows another flowchart of illustrative steps involved in enabling improved video conferencing, in accordance with some embodiments of the disclosure.

FIG. 11 shows another flowchart of illustrative steps involved in enabling improved video conferencing, in accordance with some embodiments of the disclosure. Process 1100 may be implemented, in whole or in part, on any of the aforementioned computing devices (e.g., computing devices 102, 110, 602, 900, e.g., by way of executing one or more instructions or routines stored in the memory or storage of a device). In addition, one or more actions of the process 1100 may be incorporated into or combined with one or more actions of any other process or embodiments described herein.

At 1102, a stream comprising a plurality of pictures is received, with each picture comprising a first portion and a sub-picture portion. The first portion comprises relatively dynamic content, and the sub-picture portion comprises relatively static content. For example, the first portion may relate to a received stream from a video camera of a video conference participant, and the sub-portion may relate to a received presentation from a video conference participant. At 1104, it is identified that a sub-picture portion comprises static content over a threshold number of frames. For example, it may be determined that the sub-picture shows the same, or substantially the same, content for at least 30 frames. This identification may be performed via a trained machine learning algorithm. In another example, a computer algorithm may determine a percentage difference between frames by comparing, for example, a percentage of changed pixels between frames. At 1106, a picture from the stream is accessed. At 1108, the accessed picture is decoded, and, at 1110, the decoded picture is stored in the decoded pictures buffer. At 1112, it is identified that the sub-picture of the decoded picture is below a threshold quality.

At 1114, it is identified that a sub-picture that is not below the threshold quality, and, at 1116, the decoded picture is stored in a display buffer. At 1118, the decoded picture is accessed from the display buffer, and, at 1120, the decoded picture is output, or generated for output. At 1122, the next picture in the stream is accessed, and the process loops back to step 1008 until, for example, all of the pictures in the stream have been accessed.

At 1124, it is identified that a sub-picture that is below the threshold quality, and, at 1126, a first portion of the picture is output, and a previously output sub-picture is continued to be output. At 1128, the next picture in the stream is accessed, and the process loops back to step 1106 until, for example, all of the pictures in the stream have been accessed.

Figure 12:
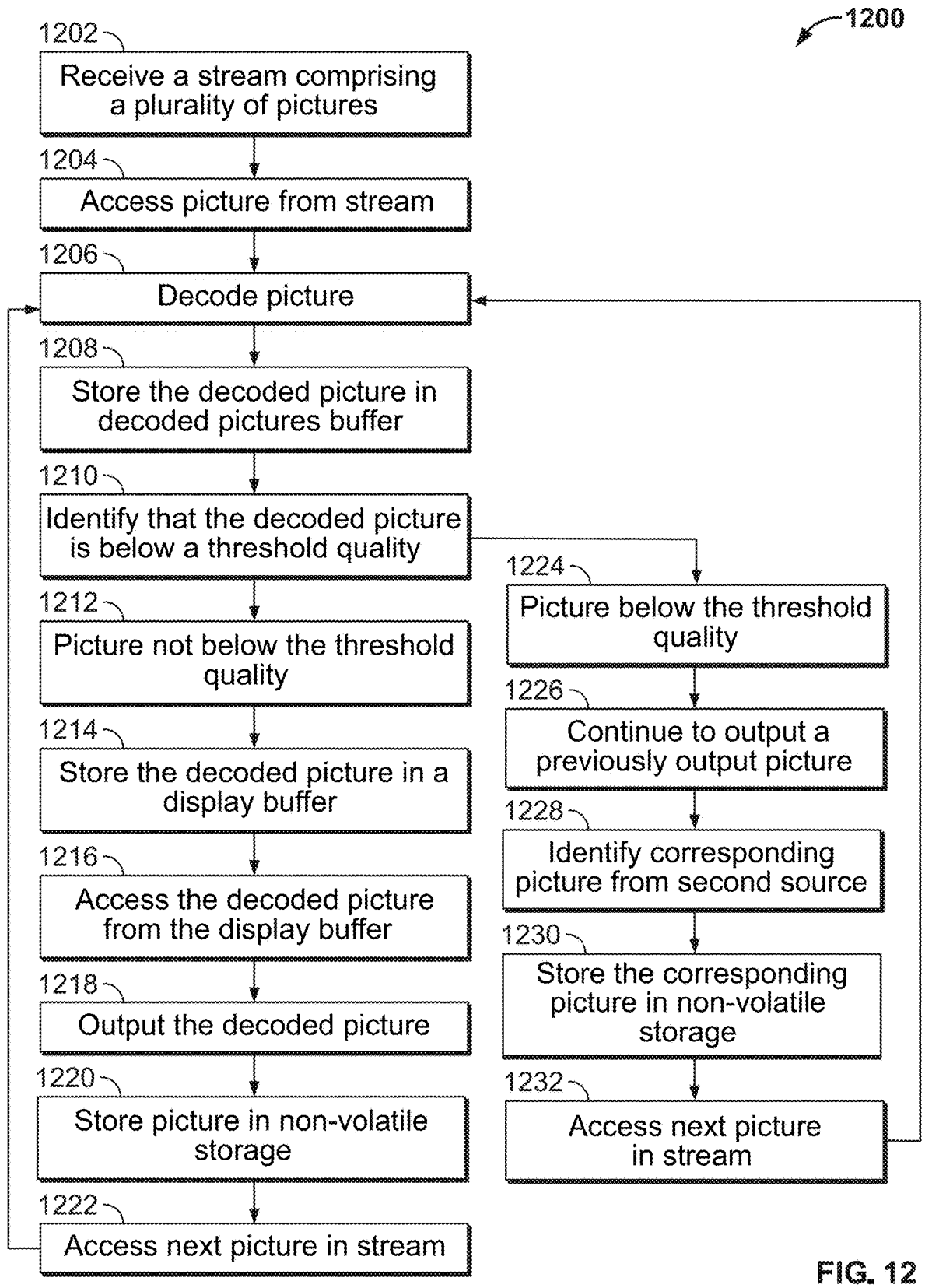
FIG. 12 shows another flowchart of illustrative steps involved in enabling improved video conferencing, in accordance with some embodiments of the disclosure.

FIG. 12 shows another flowchart of illustrative steps involved in enabling improved video conferencing, in accordance with some embodiments of the disclosure. Process 1200 may be implemented, in whole or in part, on any of the aforementioned computing devices (e.g., computing devices 102, 110, 602, 900, e.g., by way of executing one or more instructions or routines stored in the memory or storage of a device). In addition, one or more actions of the process 1200 may be incorporated into or combined with one or more actions of any other process or embodiments described herein.

At 1202, a stream comprising a plurality of pictures is received. The stream may be a live stream. At 1204, a picture from the stream is accessed. At 1206, the accessed picture is decoded, and, at 1208, the decoded picture is stored in the decoded pictures buffer. At 1210, it is identified that the decoded picture is below a threshold quality. At 1212, it is identified that a picture that is not below the threshold quality, and, at 1214, the picture is stored in a display buffer. At 1216, the decoded picture is accessed from the display buffer, and, at 1218, the decoded picture is output, or generated for output. At 1220, the accessed picture is stored in non-volatile storage. For example, the accessed picture may be stored in non-volatile storage local to the computing device that accessed the picture. In another example, the accessed picture may be transmitted to a server remote from the computing device that accessed the picture. At 1222, the next picture in the stream is accessed, and the process loops back to step 1206 until, for example, all of the pictures in the stream have been accessed.

At 1224, it is identified that a picture that is below the threshold quality, and, at 1226, a previously output picture is continued to be output, or generated for output. At 1222, a corresponding picture from a second source is identified, for example, from a content delivery network. At 1230, the corresponding picture is stored in non-volatile storage. For example, the accessed picture may be stored in non-volatile storage local to the computing device that accessed the picture. In another example, the accessed picture may be transmitted to a server remote to the computing device that accessed the picture. At 1232, the next picture in the stream is accessed, and the process loops back to step 1206 until, for example, all of the pictures in the stream have been accessed.

Figure 13:
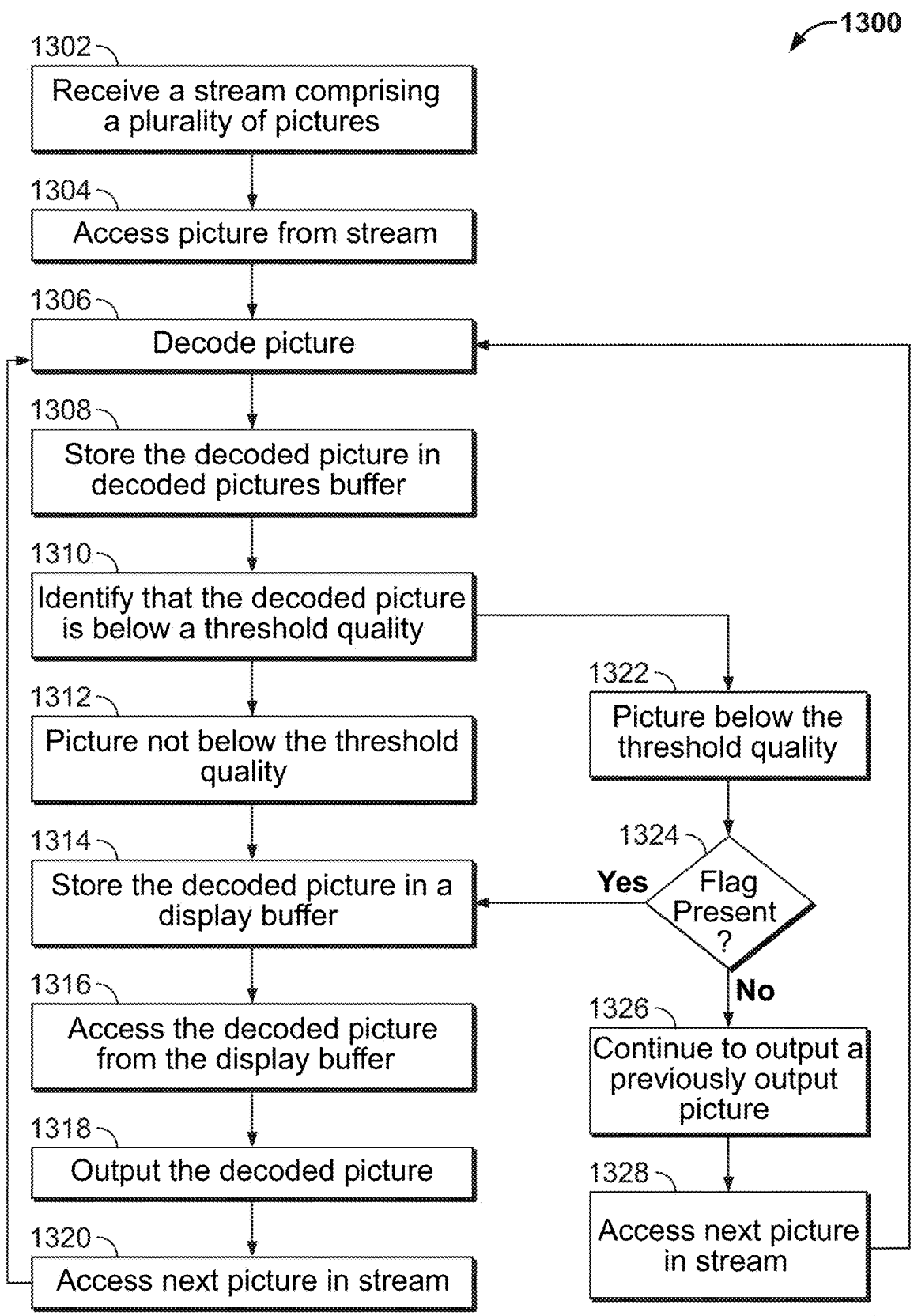
FIG. 13 shows another flowchart of illustrative steps involved in enabling improved video conferencing, in accordance with some embodiments of the disclosure.

FIG. 13 shows another flowchart of illustrative steps involved in enabling improved video conferencing, in accordance with some embodiments of the disclosure. Process 1300 may be implemented, in whole or in part, on any of the aforementioned computing devices (e.g., computing devices 102, 110, 602, 900, e.g., by way of executing one or more instructions or routines stored in the memory or storage of a device). In addition, one or more actions of the process 1300 may be incorporated into or combined with one or more actions of any other process or embodiments described herein.

At 1302, a stream comprising a plurality of pictures is received, and at 1304, a picture from the stream is accessed. At 1306, the accessed picture is decoded, and, at 1308, the decoded picture is stored in the decoded pictures buffer. At 1310, it is identified that the decoded picture is below a threshold quality.

At 1312, it is identified that a picture that is not below the threshold quality, and, at 1314, the picture is stored in a display buffer. At 1316, the decoded picture is accessed from the display buffer, and, at 1318, the decoded picture is output, or generated for output. At 1320, the next picture in the stream is accessed, and the process loops back to step 1306 until, for example, all of the pictures in the stream have been accessed.

At 1322, it is identified that a picture that is below the threshold quality, and, at 1324, it is identified whether a flag to not output previously output picture for display is present. On identifying the flag, the process proceeds to 1314, where the picture is stored in a display buffer. If, at 1324, it is identified that a flag is not present, then the process proceeds to step 1326, where a previously output picture is continued to be output, or generated for output. At 1328, the next picture in the stream is accessed, and the process loops back to step 1006 until, for example, all of the pictures in the stream have been accessed.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving, at a computing device, a stream comprising a plurality of pictures; and
for each picture in the plurality of pictures:
  decoding the picture;
  storing, in a decoded pictures buffer, the decoded picture;
  identifying that the decoded picture is below a threshold quality; and
  for a first decoded picture that is not below the threshold quality:
    storing, in a display buffer, the decoded picture;
    accessing, from the display buffer, the decoded picture; and
    outputting, for display, the decoded picture; and
  for a second decoded picture that is below the threshold quality:
    continuing to output, for display, a previously output picture.

2. The method of claim 1 further comprising identifying that the plurality of pictures comprises static content over a threshold number of frames.

3. The method of claim 1, wherein:
each picture comprises a first portion and a sub-picture portion;
the method further comprises:
  identifying that the sub-picture portion comprises static content over a threshold number of frames; and
for each picture in the plurality of pictures:
  the identifying that the decoded picture is below the threshold quality further comprises identifying that the sub-picture of the decoded picture is below the threshold quality; and
  for a first decoded sub-picture that is below the threshold quality:
    storing, in the display buffer, the decoded picture;
    accessing, from the display buffer, the decoded picture; and
    the outputting the previously output picture for display further comprises outputting, for display, the first portion of the picture and a previously output sub-portion of a picture.

4. The method of claim 1, wherein:
the stream is a live stream received from a first source; and
the method further comprises, for each picture in the plurality of pictures:
  for the first decoded picture that is not below the threshold quality:
    storing, in a non-volatile storage, the decoded picture; and
  for the second decoded picture that is below the threshold quality:
    identifying, from a second source, a corresponding picture above the threshold quality; and
    storing, in the non-volatile storage, the corresponding picture.

5. The method of claim 1, wherein:
the stream is a first stream;
the plurality of pictures is a first plurality of pictures; and
the method further comprises:
  receiving a second stream comprising a second plurality of pictures, the second plurality of pictures comprising higher resolution portions of the content of the first stream;

receiving the stream further comprises receiving the pictures from the first stream and the pictures from the second stream in an alternating manner;
the method further comprises:
for each picture in the plurality of pictures of the second stream:
decoding the picture from the second stream; and
storing, in the decoded pictures buffer, the decoded picture from the second stream;
receiving a request to zoom in on a portion of a picture of the first stream;
identifying, from the decoded pictures buffer, a decoded picture from the second stream that corresponds to the portion of picture of the stream for which the zoom-in request was received; and
outputting, for display, the identified decoded picture from the second stream.

6. The method of claim 1, wherein the content of the plurality of pictures comprises text, and the method further comprises:
receiving metadata describing the text location and position within each picture of the plurality of pictures;
identifying a reduction in a quality of the received stream; and
for each picture in the plurality of pictures:
for the first decoded picture that is not below the threshold quality:
rendering, based on the received metadata, the text; and wherein:
outputting the decoded picture for display further comprises concurrently outputting, for display, the decoded picture and the rendered text at the location described in the metadata; and
for the second decoded picture that is below the threshold quality:
continuing to output the previously output picture for display further comprises concurrently outputting, for display, the previously output picture and the rendered text at the location described in the metadata.

7. The method of claim 1 further comprising, for a picture in the plurality of pictures:
identifying, for the picture and based on a flag associated with the picture, not to output a previously output picture for display in place of the picture; and
for a second decoded picture that is below the threshold quality:
storing, in a display buffer, the decoded picture;
accessing, from the display buffer, the decoded picture; and
outputting, for display, the decoded picture.

8. The method of claim 1, wherein the content of the plurality of pictures comprises text, and the method further comprises:
receiving metadata describing the text location and position within each picture of the plurality of pictures;
receiving an input corresponding to a described text location; and
for each picture in the plurality of pictures:
for the first decoded picture that is not below the threshold quality:
rendering, based on the received metadata, the text; and wherein:
outputting the decoded picture for display further comprises concurrently outputting, for display, the decoded picture and the rendered text at the location described in the metadata; and
for the second decoded picture that is below the threshold quality:
continuing to output the previously output picture for display further comprises concurrently outputting, for display, the previously output picture and the rendered text at the location described in the metadata.

9. The method of claim 8, wherein the input is a first input and the method further comprises:
receiving a second input to copy the output text; and
storing, based on the received metadata, the copied output text on a clipboard of the computing device.

10. The method of claim 1, wherein, for the second decoded picture that is below the threshold quality:
the method further comprises:
identifying, in the previously output picture, a text portion and a corresponding location;
applying text recognition to the text portion; and
rendering, based on the text recognition, the text; and
continuing to output the previously output picture for display further comprises concurrently outputting, for display, the previously output picture and the rendered text at the identified location.

11. A system comprising:
input/output circuitry configured to:
receive, at a computing device, a stream comprising a plurality of pictures; and
processing circuitry configured to, for each picture in the plurality of pictures:
decode the picture;
store, in a decoded pictures buffer, the decoded picture;
identify that the decoded picture is below a threshold quality; and
for a first decoded picture that is not below the threshold quality:
store, in a display buffer, the decoded picture;
access, from the display buffer, the decoded picture; and
output, for display, the decoded picture; and
for a second decoded picture that is below the threshold quality:
continue to output, for display, a previously output picture.

12. The system of claim 11, wherein the processing circuitry is further configured to identify that the plurality of pictures comprises static content over a threshold number of frames.

13. The system of claim 11, wherein:
each picture comprises a first portion and a sub-picture portion;
the processing circuitry is further configured to:
identify that the sub-picture portion comprises static content over a threshold number of frames; and
for each picture in the plurality of pictures:
the processing circuitry configured to identify that the decoded picture is below the threshold quality is further configured to identify that the sub-picture of the decoded picture is below the threshold quality; and
for a decoded sub-picture that is below the threshold quality:
store, in the display buffer, the decoded picture;
access, from the display buffer, the decoded picture; and
the processing circuitry configured to output the previously output picture for display is further configured to output, for display, the first portion of the picture and a previously output sub-portion of a picture.

14. The system of claim 11, wherein:
the stream is a live stream received from a first source; and
the processing circuitry is further configured to, for each picture in the plurality of pictures:
for the first decoded picture that is not below the threshold quality:
store, in a non-volatile storage, the decoded picture; and
for the second decoded picture that is below the threshold quality:
identify, from a second source, a corresponding picture above the threshold quality; and
store, in the non-volatile storage, the corresponding picture.

15. The system of claim 11, wherein:
the stream is a first stream;
the plurality of pictures is a first plurality of pictures; and
the processing circuitry is further configured to:
receive a second stream comprising a second plurality of pictures, the second plurality of pictures comprising higher resolution portions of the content of the first stream;
the processing circuitry configured to receive the stream is further configured to receive the pictures from the first stream and the pictures from the second stream in an alternating manner;
the processing circuitry is further configured to:
for each picture in the plurality of pictures of the second stream:
decode the picture from the second stream; and
store, in the decoded pictures buffer, the decoded picture from the second stream;
receive a request to zoom in on a portion of a picture of the first stream;
identify, from the decoded pictures buffer, a decoded picture from the second stream that corresponds to the portion of picture of the stream for which the zoom-in request was received; and
output, for display, the identified decoded picture from the second stream.

16. The system of claim 11, wherein the content of the plurality of pictures comprises text, and the processing circuitry is further configured to:
receive metadata describing the text location and position within each picture of the plurality of pictures;
identify a reduction in a quality of the received stream; and
for each picture in the plurality of pictures:
for the first decoded picture that is not below the threshold quality:
render, based on the received metadata, the text; and wherein:
the control circuitry configured to output the decoded picture for display is further configured to concurrently output, for display, the decoded picture and the rendered text at the location described in the metadata; and
for the second decoded picture that is below the threshold quality:
the processing circuitry configured to continue to output the previously output picture for display is further configured to concurrently output, for display, the previously output picture and the rendered text at the location described in the metadata.

17. The system of claim 11 wherein, for a picture in the plurality of pictures, the processing circuitry is further configured to:
identify, for the picture and based on a flag associated with the picture, not to output a previously output picture for display in place of the picture; and
for a second decoded picture that is below the threshold quality:
store, in a display buffer, the decoded picture;
access, from the display buffer, the decoded picture; and
output, for display, the decoded picture.

18. The system of claim 11, wherein the content of the plurality of pictures comprises text, and the processing circuitry is further configured to:
receive metadata describing the text location and position within each picture of the plurality of pictures;
receive an input corresponding to a described text location; and
for each picture in the plurality of pictures:
for the first decoded picture that is not below the threshold quality:
render, based on the received metadata, the text; and wherein:
the processing circuitry configured to output the decoded picture for display is further configured to concurrently output, for display, the decoded picture and the rendered text at the location described in the metadata; and
if the decoded picture is below the threshold quality:
the processing circuitry configured to continue to output the previously output picture for display is further configured to concurrently output, for display, the previously output picture and the rendered text at the location described in the metadata.

19. The system of claim 18, wherein:
the input is a first input;
the input/output circuitry is further configured to receive a second input to copy the output text; and
the control circuitry is further configured to store, based on the received metadata, the copied output text on a clipboard of the computing device.

20. The system of claim 11, wherein, for the second decoded picture that is below the threshold quality:
the processing circuitry is further configured to:
identify, in the previously output picture, a text portion and a corresponding location;
apply text recognition to the text portion; and
render, based on the text recognition, the text; and
the processing circuitry configured to continue to output the previously output picture for display is further configured to concurrently output, for display, the previously output picture and the rendered text at the identified location.

* * * * *